United States Patent
Renaudie

[15] 3,658,081

[45] Apr. 25, 1972

[54] AUTOMATIC CHANGE OVER SWITCHING DEVICE

[72] Inventor: Jacques Henri Renaudie, Boulogne-sur-Seine, France

[73] Assignee: L'Air Liquide, Societe Anonyme pour L'Etude et L'Exploitation des Procedes Georges Claude, Paris, France

[22] Filed: Apr. 27, 1970

[21] Appl. No.: 32,059

[52] U.S. Cl. ........................................... 137/113
[51] Int. Cl. ........................................... G05d 7/01
[58] Field of Search ................... 137/100, 113; 222/6

[56] References Cited

UNITED STATES PATENTS 2,547,823 4/1951 Josephian ........................ 137/113
2,168,701 8/1939 Buttner ........................ 137/113 X
2,257,249 9/1941 Thomas ........................ 137/113 X

*Primary Examiner*—Robert G. Nilson
*Attorney*—Young & Thompson

[57] ABSTRACT

This Automatic change over switching device comprises two pressure regulators the valve head of which is on the inlet side of the valve seat and which regulate the pressure to different values when the device is in operation. The pressure regulator which is fed at the lowest pressure expands the gas at the highest pressure and lets the gas pass until its inlet pressure falls at a too low value. At this moment the other pressure regulator begins working.

2 Claims, 2 Drawing Figures

INVENTOR
JACQUES HENRI RENAUDIE
BY Young + Thompson
ATTYS.

AUTOMATIC CHANGE OVER SWITCHING DEVICE

This invention relates to an automatic switching device for use in a gas supply line and, more particularly but not exclusively, is concerned with an automatic switching device which allows a continuous supply of gas to pass through the automatic switching device while it is in use.

There are already known switching devices comprising two pressure regulators or expansion devices, and in such a switching device both the pressure regulators usually are not used simultaneously but are adjusted so that, in operation, the two regulators supply gas at different pressures. When it becomes necessary to change the gas cylinder or other source supplying gas to the switching device, it is necessary to change from one pressure regulator to the other, this being effected by changing the regulation pressure of the two regulators. This change-over requires the intervention of an operator and results in a sharp difference in the downstream pressure. If a supplementary pressure regulator fed by this switching device is added downstream of the latter, the pressure at the inlet to the supplementary regulator remains higher than the pressure of gas issuing from the supplementary regulator, and this prevents the gas cylinders or other sources from being emptied as completely as would be possible in the absence of the supplementary pressure regulator. A more complete emptying of the sources would nevertheless remain possible, but only if a pressure drop of the gas issuing from the switching device is acceptable, and this is very frequently not so.

Accordingly, the present invention provides an automatic switching device for the supply of a gas, comprising two pressure regulators each comprising an inlet for the gas, an outlet for the gas, a valve disposed between said inlet and outlet and which, in operation, controls the flow of gas from the inlet to the outlet, and an actuator influencing movement of the valve, wherein the outlets of the two pressure regulators are interconnected, the valve of each regulator has a head and a seat of which the head is on the inlet side of the seat, the actuator comprises a movable and fluid-tight wall connected to the valve and submitted on one face thereof to the outlet gas pressure and biasing means tending to move said wall so as to open the valve, the forces exerted by said biasing means being equal for the two regulators and being stronger than the force exerted on each of the actuators by the outlet gas, and each pressure regulator is constructed and adjusted so that when, in operation, the pressures at the inlets are the same, the pressures at the outlets are the same also.

The two pressure regulators can have the same design thus enabling them easily to give, in operation, the same outlet pressures when the pressures at the inlets are the same.

The movable and fluid-tight wall of the actuator can be, for example a flexible diaphragm, a movable piston or bellows.

It is advantageous to have an actuator at least part of which can operate on both valves; this can be accomplished by having, for example, an actuator sandwiched between the two expansion devices and comprising two movable and fluid-tight walls, one connected to the head of each valve, and a means for applying a force against the two walls tending to separate them which is placed between the two walls. With an actuator of this type, the two pressure regulators can be constructed in a single assembly.

It is also advantageous to provide a third pressure regulator, which is supplied from the means used to connect the outlets of the first two pressure regulators. If the first two regulators are constructed in a single assembly with an actuator sandwiched between the two pressure regulators, the third expansion device can advantageously have a pipe attached to its outlet which communicates with the actuator of the first two pressure regulators, thereby providing a pressure which can assist in the application of the force tending to keep the walls of the actuator apart.

The automatic switching device according to the present invention is preferably constructed in robust form and of relatively small size; it does not need to have connections downstream of the pressure regulators. The pressure regulators are preferably constructed so that the pressure of the expanded gas increases sharply when the pressure of the gas before expansion decreases. This condition is satisfied when the effective area of the valve, that is, the area of surface enclosed by the line along which the valve head bears on its seat, is not too small relative to the surface area of the movable and fluid-tight wall. In general, the surface area of the movable and fluid-tight wall will have an area at most 50 times larger than the effective area of the valve.

The pressure regulators are preferably constructed in such a way that the pressure of the expanded gas depends little on the rate of flow, and this can be achieved by using a relatively large valve. In this way, the tendency for simultaneous functioning of the two pressure regulators under high rates of flow is reduced when the gas source which is at the lower pressure, i.e. that which is supplying gas to the pressure regulator operating under the circumstances, is almost empty. For example, for a constant pressure of 0.5 bar upstream of the automatic switching device, the pressure downstream of the automatic switching device will only fall by a maximum of 0.1 bar when the flow rate increases from zero to 20 cubic metres per hour.

The automatic switching devices according to the present invention can be used for a wide variety of purposes: for example, for the supply of gas to workshops for gas welding or for arc welding in a protective atmosphere; for the distribution of gases in hospitals; or for supplying gas for the heating of furnaces.

An automatic switching device according to the present invention is especially advantageous for the supply of gas at a controlled and practically not varying pressure and where a high degree of emptying of the gas cylinders is desired. For example, for a gas supply at 0.03 bar, the gas cylinders can be emptied to a pressure of 0.5 bar. As will hereinafter be seen, a high degree of emptying of the gas cylinders is attained, in the case of cylinders containing dissolved acetylene because the switching device automatically restores to the circuit a gas cylinder which has recently stopped delivering gas once the pressure therein has risen again due to the natural reheating which follows the cooling effect caused by the liberation of acetylene gas from the solution.

For a better understanding of the invention and to show how the same can be carried into effect, reference will now be made, by way of example, to the accompanying drawings in which.

Figure 1:
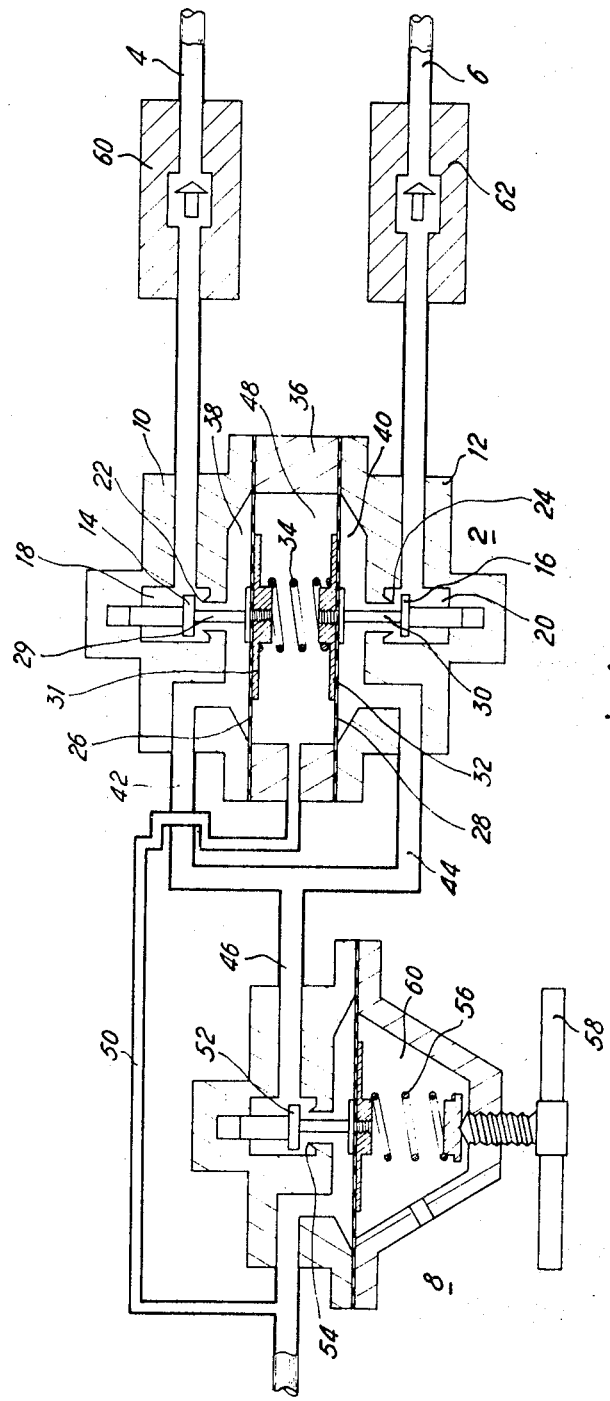
FIG. 1 is a diagrammatic cross-section through a first embodiment of the present invention.

The automatic switching device shown in FIG. 1 comprises a first assembly 2, which is supplied through two pipes 4, 6 containing stop valves 60 and 62 which allow a unidirectional flow of gas and which connect the automatic switching device respectively to two gas sources such as groups of gas cylinders which contain, for example, compressed or dissolved gas; and a second assembly 8, supplied through the first assembly 2.

The first assembly 2 comprises two pressure regulators 10, 12 which are the same design. Each regulator comprises a valve, of which the head 14 or 16 is disposed in a chamber 18 or 20 upstream of the corresponding valve seat 22 or 24. Movable and fluid-tight walls, such as diaphragms 26, 28, are connected to valve heads by rods 29, 30 screwed into plates 31, 32 fixed to the diaphragms.

The outer faces of the two diaphragms define two chambers 38, 40 in the body 36 of the assembly 2; these chambers receive the expanded gases via the valves 14, 16 and supply the second assembly 8, comprising a pressure regulator, through separate tubes 42, 44 and then through a single tube 46. The inner faces of the diaphragms define a central chamber 48 which communicates with the outlet of pressure regulator 8 through a tube 50.

The diaphragms 26, 28 are thus each subjected on one face to the pressure of the gas in the chambers 38 and 40 which has been subjected to a first expansion, and on the other face to the action of a flexible spring 34 and to the pressure of gas in assembly 8 which has undergone a second expansion. This arrangement ensures that the pressure of gas issuing from the outlet of the automatic switching device is very constant. The action of forces on the diaphragms inside the chamber 48 are equal and in opposite directions; the forces do not vary when the diaphragms experience equal displacements in the same direction and they vary little when the diaphragms are displaced relative to one another, any variation then being due only to the change in length of the spring 34. This variation is small because of the flexibility of the spring.

The pressure regulators 10, 12 are constructed with diaphragms having substantially the same physical characteristics, in particular, having the same flexibility and the same surface area; and with valves having substantially the same physical characteristics. They are formed in a manner such that even if their outlets were not interconnected, the pressures at their outlets would be the same if the pressures at their inlets were the same.

In this embodiment of the invention, the pressure regulators of the assembly 2 are constructed so that the pressure of the expanded gas increases sharply when the pressure of the gas before expansion, that is the pressure of the gas at the inlet, decreases. For example, it rises from 1.3 to 1.6 bars above atmospheric pressure during the emptying of a gas source whose initial pressure was 15 bars.

The pressure regulator 8 similarly has a valve head 52 disposed on the high-pressure side relative to its seat 54. The diaphragm of this regulator is subjected, on that face which does not receive the pressure of gas coming from assembly 2, to atmospheric pressure and to the thrust of a regulating spring 56. A screw 58 permits the spring to be compressed to a greater or lesser degree, so that the pressure of the gas which leaves assembly 8 can be varied.

The operation of the automatic switching device of FIG. 1 is as follows. Initially, that of the two pipes 4, 6 which is connected to the gas source at the lower pressure supplies gas through the valve to the corresponding pressure regulator 10 or 12, while the other valve remains closed. This is because the pressure downstream of the valve of the regulator which is operating varies inversely with the pressure upstream of that valve. If the two gas sources have substantially the same pressure, a lack of balance may be caused by temporarily closing one of the two pipes 4 and 6 while letting the automatic switching pipes device deliver gas to the apparatus to which it is connected.

Assuming now that valve 14, 22 is initially open, if the pressure in pipe 4 decreases, whilst the switching device is allowing gas to pass towards the place of use, valve 14, 22 remains open, but the pressure of the gas expanded by passing through this valve increases. This increase, transmitted through tubes 42 and 44 to chamber 40, prevents the opening of valve 16, 24. When the gas source supplying pipe 4 is almost empty and the pressure in pipe 4 would become lower than that of the gas which would pass through regulator 12 when no gas flows through it, valve 16, 24 opens and expansion device 12 becomes operative. Then the pressure exerted on the upper face of the diaphragm 26 closes valve 14, 22 and stops the delivery of gas through pipe 4. If the source supplying pipe 4 is slightly less empty, then, since the pressure of gas after expansion in pressure regulator 10 decreases when the rate of flow increases, when the rate of flow through this pressure regulator is high, the outlet pressure of regulator 10 can fall to the pressure of gas after expansion of regulator 12 when there is no flow of gas through this regulator, even though the pressure in the pipe 4 is itself slightly higher then the outlet pressure of regulator 12; the two pressure regulators then deliver simultaneously. The stop valve 60 prevents gas from pipe 6 entering pipe 4 when the pressure of the gas leaving regulator 12 is higher than the pressure in pipe 4; similarly the stop valve 62 prevents a back-flow of gas through pipe 6.

If the gas sources are cylinders of dissolved gas, for example dissolved acetylene, the cylinder connected to pipe 4 is cool when it liberates gas from solution, thus causing an additional lowering of its pressure. When the automatic switching device comes into operation and switches the supply from pipe 4 to pipe 6, the cylinder attached to pipe 4 warms up and thus the pressure of gas in pipe 4 rises; gas then passes through valve 14, 22, in addition to that passing through the valve 16, 24. When this process of cooling and rewarming has come to an end and no more gas can be extracted from the solution in the cylinder connected to pipe 4, it is then possible to replace this empty cylinder with a full one, which is thus at a higher pressure than that connected to pipe 6. Because of this pressure difference, valve 14, 22 remains closed, or if it was not closed, the valve is then closed.

When the rate of flow is high, the pressure drop in the first assembly lowers the pressure in tube 46, and thus increases the pressure downstream of expansion device 8 and in chamber 48. Thus a counterbalance effect results from the pressure drop in assembly 2.

The expansion device 8 is thus supplied at a substantially constant pressure and therefore it expands gas to a practically constant pressure, providing it is designed to give a downstream pressure which depends very little on the rate of flow.

Other arrangements are possible with an automatic switching device resembling that in FIG. 1; for example, chamber 48 can be connected to an independent gas source at a constant pressure, and if this pressure is the same as that required for the gas issuing from the assembly, the spring 34 can be omitted. Similarly, the space below the diaphragm of expansion device 8 can be connected to an independent gas source at constant pressure, and if this pressure is the same as that required for the gas issuing from the automatic switching device, the spring 56 can be omitted. The valve of pressure regulator 8 can also have its head on the low pressure side of the seat.

Figure 2:
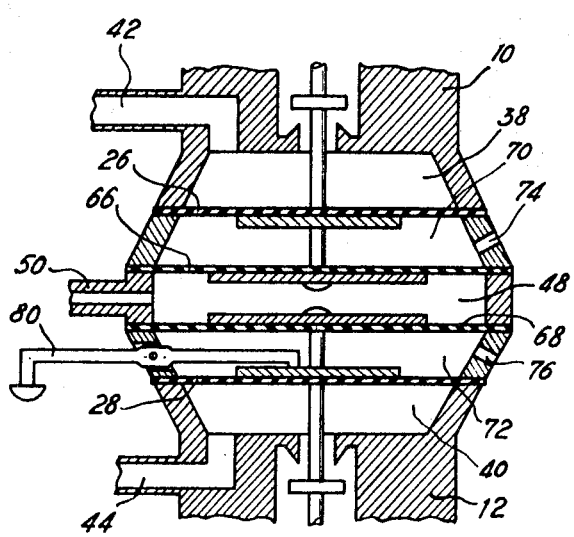
FIG. 2 is a diagrammatic cross-section through part of a second embodiment of the present invention.

FIG. 2 represents an alternative form of the first assembly 2 of an automatic switching device according to the present invention in which the force exerted by the spring 34 of FIG. 1 is replaced by that due to a gas pressure. As well as having diaphragms 26, 28, this device contains two larger diaphragms 66, 68. The chamber 48 between diaphragms 66, 68 is connected to the outlet of pressure regulator 8 by way of a tube 50; the intermediate chambers 70, 72 between diaphragms 26, 66 and 28, 68 communicate with the atmosphere through holes 74, 76 and the outer chambers 38, 40 are connected to the inlet of pressure regulator 8, as in FIG. 1.

The difference in pressures acting on the two faces of diaphragm 66 is smaller than that between the opposing pressures acting on the two faces of diaphragm 26. The free surface areas of diaphragm 26 are made smaller than those of diaphragm 66 to an extent such that the resulting action tends to open the valve when the pressure in chamber 38 is lower than the control pressure desired for pressure regulator 10. Thus, the force of the spring 34 of FIG. 1 (which depends on the distance between the diaphragm 26 and 28) is replaced by that resulting from a gas pressure acting on diaphragms 66, 68. This force does not depend on the relative displacement of the diaphragms.

With an automatic switching device comprising an assembly as shown in FIG. 2, both valves of this assembly would remain closed on starting, because initially there is no pressure in the space 48. In order to avoid this disadvantage, a means is provided for manually opening one of the valves on starting, such as a lever 80.

What I claim is:

1. An automatic device for the supply of gas from a pair of sources and for switching from one source to the other when the first source is practically exhausted, comprising two pressure regulators each of which comprises an inlet for the gas from one of said sources, an outlet for the gas, a valve disposed between said inlet and outlet and which, in operation, controls the flow of gas from the inlet to the outlet, and an actuator influencing movement of the valve, means interconnecting the outlets of the two pressure regulators, the valve of each regulator having a head and a seat, said head being on the inlet side of the seat, said actuator comprising a movable and fluid-tight wall connected to the valve head and subjected to one face thereof to the outlet gas pressure, biasing means tending to move said wall so as to open the valve, the forces exerted by said biasing means being equal for the two regulators and being stronger than the forces exerted on each of the actuators by the outlet gas, each pressure regulator being constructed and adjusted so that, when in operation the pressures at the inlets are the same, the pressures at the outlets are the same also, a single gas source external to said pressure regulators and delivering to said walls a gas at substantially constant pressure whereby at least the greater portion of the forces exerted by said biasing means is exerted by the action of said single gas source, and a third pressure regulator having an inlet and an outlet, said inlet being connected with the outlets of both first-named pressure regulators, said outlet of said third regulator comprising said external gas source.

2. An automatic device as claimed in claim 1, said third pressure regulator comprising an inlet for the gas from both said first-named pressure regulators, an outlet for the gas, the last-named outlet comprising said external gas source, a valve disposed between said inlet and outlet and which, in operation, controls the flow of gas from the inlet to the outlet, and an actuator influencing the movement of the last-named valve, the last-named valve having a head and a seat of which the head is on the inlet side of the seat.

* * * * *